(No Model.)
C. E. SCRIBNER.
TESTING APPARATUS FOR MULTIPLE SWITCHBOARDS.
No. 563,323. Patented July 7, 1896.
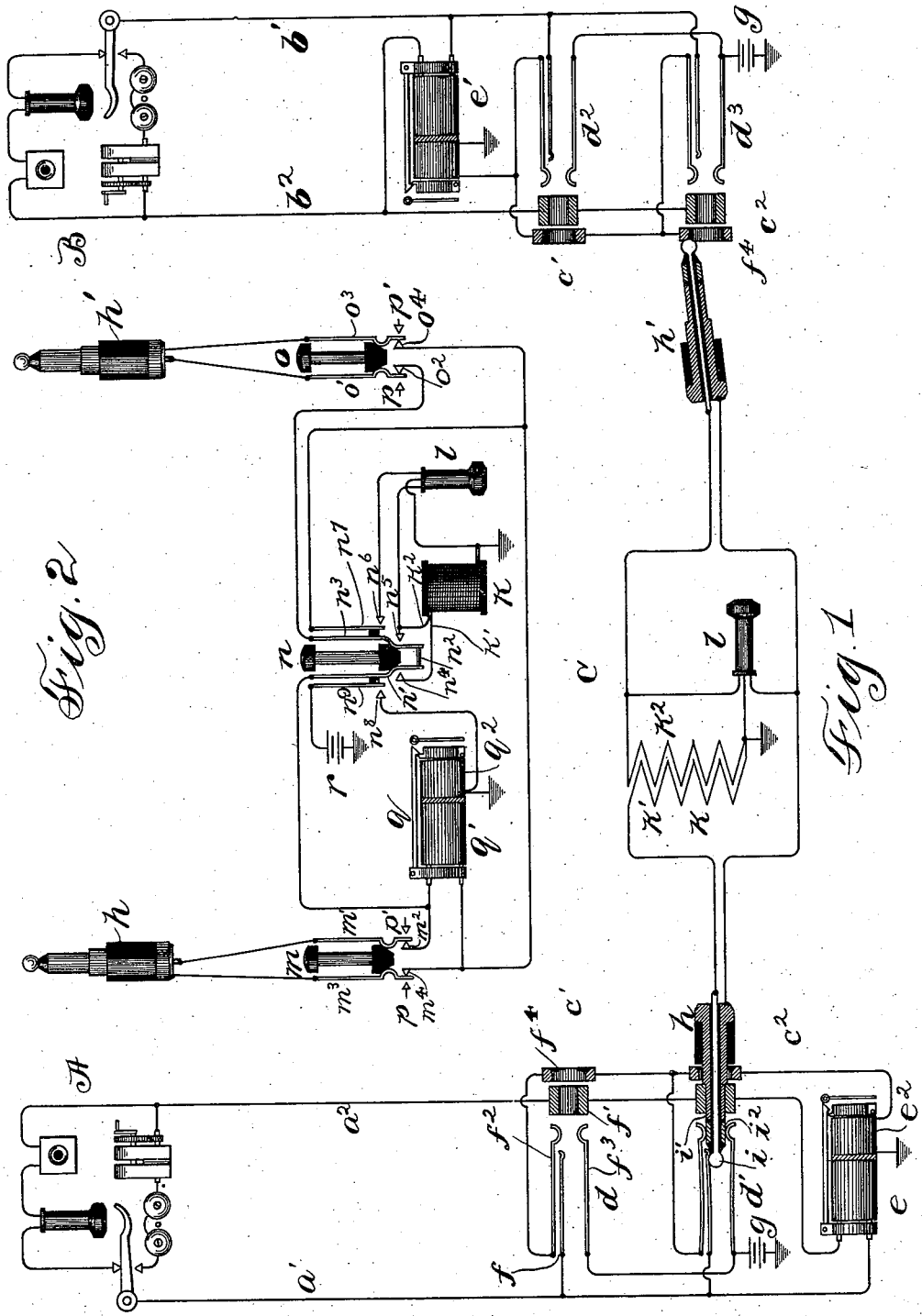
WITNESSES
George L. Cragg.
W. Clyde Jones.
INVENTOR:
Charles E. Scribner.
By Barton & Brown
Attorneys

UNITED STATES PATENT OFFICE.

CHARLES E. SCRIBNER, OF CHICAGO, ILLINOIS, ASSIGNOR TO THE WESTERN ELECTRIC COMPANY, OF SAME PLACE.

TESTING APPARATUS FOR MULTIPLE SWITCHBOARDS.

SPECIFICATION forming part of Letters Patent No. 563,323, dated July 7, 1896.

Application filed November 13, 1893. Serial No. 490,743. (No model.)

*To all whom it may concern:*

Be it known that I, CHARLES E. SCRIBNER, a citizen of the United States, residing at Chicago, in the county of Cook and State of Illinois, have invented a certain new and useful Improvement in Testing Apparatus for Multiple Switchboards, (Case No. 328,) of which the following is a full, clear, concise, and exact description, reference being had to the accompanying drawings, forming a part of this specification.

My invention relates to apparatus for test-circuits of multiple switchboards of telephone-exchanges, more particularly to the appliances used by an operator in testing a line to determine whether it is already in use or not.

In multiple switchboards it is customary to employ one member of a pair of plugs to make connection with the line of a subscriber calling and the other member of the same pair in making the test of the line called for, the latter plug being immediately inserted into the jack tested if its line be found free. In switchboards in which the test-pieces of the spring-jacks are grounded, however, as in grounded lines, and in test systems having independent test-circuits grounded through self-restoring annunciators, the application of a plug whose mate is connected with a metallic circuit-line to such a grounded piece destroys the balance of the metallic circuit; and if it be subject to inductive disturbances this loss of balance between the opposed electromotive forces of the two lines of the metallic circuit permits a current to flow from one limb to earth through the telephone of the operator making the test, which current masks or obscures the test-signal. My invention aims to avoid this disturbance of balance of the metallic circuit connected with one plug when the other plug of the pair is grounded by grounding the cord conductor uniting the testing piece or tip of the testing-plug with the connected or "answering" plug through a resistance sufficient to preserve the balance of the metallic circuit, the operator's telephone, grounded at its center, being bridged between the two cord-strands uniting the plugs in the usual manner, and its neutrality as to induced currents in the metallic circuit being preserved by a repeating-coil having one helix connected in the ground branch from the cord conductor and its other helix in circuit with the corresponding side of the telephone.

I have illustrated my invention in the accompanying drawings, and will describe it in detail, with reference to the drawings.

Figure 1 of the drawings represents diagramatically two substations, each connected by a metallic circuit-line with apparatus upon a switchboard at an exchange. With one of the lines connection has been made by the operator, as in response to a call-signal from the line, by means of one of a pair of plugs, the other member of the pair being shown in the act of testing a spring-jack of the other line. The plugs are connected together and with an operator's telephone in the manner which constitutes my invention. Fig. 2 is a diagram of the plugs and their uniting circuits complete, including the keys for sending call-signals and a key for connecting or disconnecting the operator's telephone and testing appliances.

A and B, Fig. 1, represent two substations, each equipped with the usual telephonic and signaling appliances, and each connected through line-wires $a'$ $a^2$ $b'$ $b^2$, respectively, with spring-jacks and an individual annunciator upon a multiple switchboard $c$ at the exchange. The lines $a'$ $a^2$ are connected with spring-jacks $d$ $d'$ upon the sections $c'$ and $c^2$, respectively, of switchboard $c$, and with an annunciator $e$ upon the section $c^2$. The lines $b'$ $b^2$ likewise extend to spring-jacks $d^2$ $d^3$ upon the sections $c'$ and $c^2$ of the switchboard, and with an annunciator $e'$, which is, however, located upon the section $c'$ under the care of a different operator.

The spring-jacks $d$ $d'$ $d^2$ $d^3$ are constructed each with a line-spring $f$ and a thimble or contact-ring $f'$, with which the different sides of their line-circuits are connected, respectively, and which constitute the line-terminals upon the switchboard. In addition to these contact portions each spring-jack has two "local" springs $f^2$ $f^3$ and a test piece or ring $f^4$, electrically connected with the springs $f^2$. The springs $f^2$ of both the jacks of each line are connected together and to earth through the restoring or resetting magnet $e^2$ of the annunciator of the corresponding line. The springs $f^3$ of the same spring-jacks are likewise electrically united and are grounded through a battery $g$. The springs $f^2$ and $f^3$ of each line thus constitute the normally-separated terminals of a local circuit including the battery and the restoring-magnet of the annunciator of that line. The plug $h$, adapted for use with the spring-jacks, has a spherical tip $i$, which engages the line-spring $f$ of the jack into which it is inserted, a sleeve $i'$, which connects with the thimble $f'$, and an insulated ring $i^2$, which crosses together the local springs $f^2 f^3$, thus closing the local circuit. When the plug is inserted in a spring-jack, as in making connection with a line in response to a call or signal, the local-battery circuit being closed through the restoring-magnet of the annunciator causes the restoration of the latter to its normal position, at the same time electrifying all the test-rings $f^4$ of the line to a difference of potential from the earth. If, then, an operator at another board should apply a plug, grounded through her telephone, to a test-ring of that line, current would flow through the telephone and would produce a sound, as a click, therein, which would signify to the operator testing that the line was in use. In practice the remaining plug $h'$ of the pair is, for convenience, employed in making this test, the like parts or contact-pieces of the plugs being connected together by conductors.

In my invention the tips of the plugs $h\ h'$ are united by a conductor which includes the two helices $k'\ k^2$ of a repeating-coil $k$, the point of connection of the two helices being grounded. The sleeve-contacts of the plugs are connected directly together. An operator's telephone $l$ is connected in a bridge-wire between the two conductors or cord-strands of the plug-circuit, the middle point of the telephone-coil being also grounded in the usual manner. The connection of this bridge-wire with the tip-strand is made at a point between the repeating-coil and the plug $h'$, which is used for testing, so that while that strand is grounded the earth connection does not interfere with the reception of a test-signal in the telephone.

In Fig. 1 the plug $h$ is shown inserted in the spring-jack $d$, as in response to a call-signal from the line, while the plug $h'$ is applied to the test-ring $f^4$ of spring-jack $d^3$ of line to station B, as in testing to determine whether that line were idle or in use.

It is found necessary in telephone engineering to place the two line-wires of a telephone-circuit near together, and to balance them as to static capacity and resistance, with relation to each other, in order to avoid noise due to induced currents. In lines thus balanced the induced currents propagated in the line-wires are equal in amount and like in phase, so that if any conductor, as a telephone-coil, be bridged between the wires, the electromotive forces in the lines will at all times be balanced in the telephone and will produce no current through it. Thus in Fig. 1 if the telephone $l$ were bridged between continuous conductors uniting the like parts of the plugs, no noise would be produced in it by the surging induced currents in the line-wires $a'\ a^2$, and no harmful effect would result from the connection of the earth branch with the middle of the telephone-helix, since this branch would be to a neutral or nodal point of the system; but if now the tip of plug $h'$ were applied to a grounded test-ring $f^4$ of a line in use the equilibrium of the lines $a'\ a^2$ would be destroyed, and current would surge from earth to line through the telephone, masking the test-signal, or producing a false signal.

In my invention the surging induced current from line $a^2$ finds circuit to the plug-circuit and through one-half of the telephone $l$ to earth. Current from line $a'$ likewise finds circuit to the conductor of the plug-circuit, and thence through the helix $k'$ of the repeating-coil to earth. The helix $k'$ is constructed to have resistance about equal to one-half the coil of telephone $l$, so that currents practically equal in amount find circuit through these paths to earth. The passage of the undulating or alternating current through helix $k'$ induces a like current in helix $k^2$, which finds circuit through the remaining half of the telephone, neutralizing the effect of the current from the sleeve-strand of the plug-circuit. Silence is thus preserved in the telephone. If, now, the tip of plug $h'$ be connected to earth through a resistance insufficient to short-circuit the corresponding half of the telephone-coil, as in the act of making a test, the balance of the metallic circuit is in no wise disturbed, since the coil-conductor is already grounded at the point of junction of the helices $k'\ k^2$, while no disturbance is produced in telephone $l$ by the surging currents in the line-wires $a'\ a^2$, because the conditions which determine its silence are not perceptibly altered. In practice the impedance of the restoring-magnet $e^2$ does not permit the shunting of any perceptible telephonic or rapidly-alternating current through it. When, however, a test is made with plug $h'$, the testing-current finds circuit to earth through the half of the telephone-coil which is connected with the tip-strand of the cord, producing the characteristic test click or signal in the telephone.

In Fig. 2 a pair of plugs $h\ h'$ are represented connected together by conductors including contact-points of keys $m\ n\ o$. The keys $m$ and $o$ are calling-keys. Either of them, when depressed, acts to disconnect the corresponding plug from the other, and to connect its contact-pieces with the contact-anvils $p\ p'$, which constitute the terminals of a generator of signaling-current. The key $n$ is adapted to connect the plugs directly together when in the position shown, but to open the tip-strand and include it in the helices $k'\ k^2$ of the repeating-coil $k$, and to bridge the telephone $l$ between the two sides of the plug-circuit, when it is thrown into its alternate position. Thus in the position of the key shown the circuit may be traced from the tip of the plug $h$, through the spring $m'$ and its resting contact $m^2$ of key $m$, to spring $n'$ of key $n$, thence through stud $n^2$ to spring $n^3$, thence through anvil $o^2$ and spring $o'$ of key $o$ to the tip of plug $h'$. The circuit between the sleeve-contacts of the plugs includes only the springs and contacts $m^3$ $m^4$ and $o^3$ $o^4$ of the calling-keys $m$ and $o$, respectively.

When key $n$ is placed in its alternate position, the circuit from the tip of plug extends to spring $n'$ of key $n$, thence to anvil $n^4$, thence through both helices $k'$ $k^2$ of coil $k$ to anvil $n^5$, thence to spring $n^3$ and to tip of plug $h'$, as before. At the same time the spring $n^6$, which is connected with the sleeve-strand of the plug-circuit, is closed upon its anvil $n^7$, which constitutes one terminal of telephone $l$, thus completing a connection between the two conductors of the plug-circuit including telephone $l$.

A self-restoring clearing-out annunciator $q$ has its operating or "line" coil $q'$ permanently bridged between the conductors of the plug-circuit, and its restoring-magnet $q^2$ included in a local circuit with a battery $r$ and a pair of contact-points $n^8$ $n^9$ upon key $n$, by which circuit is closed to reset the annunciator when the telephone is connected with the plug-circuit in the usual manner.

Having thus described my invention, I claim as new and desire to secure by Letters Patent—

1. The combination with a balanced metallic-circuit telephone-line, of a testing-plug connected with one side thereof, a ground branch including resistance from the same side of the line, and a telephone bridged between the sides of the line from a point between the ground branch and the test-plug.

2. The combination with a balanced-telephone-line circuit, of a test-plug connected with one side of the line, a ground branch including resistance from the same side of the line, and a telephone grounded at its center bridged between the sides of the circuit from a point between the ground branch and the telephone, whereby a test of a grounded contact-piece may be made without disturbing the balance of the line.

3. In combination, a balanced-telephone-line circuit, one plug of a connected pair being inserted into a spring-jack of the line, a conductor uniting the tips of the plugs including in series two helices of a repeating-coil, the helices being grounded at their point of junction, and a telephone grounded at its center bridged between the conductors of the plug-circuit from a point between the test-plug and the repeating-coil, as described.

4. The combination with a plug-circuit, of a repeating-coil having its helices included in series in one conductor of the circuit, and a key adapted to disconnect the repeating-coil and close circuit directly in place thereof, as described.

In witness whereof I hereunto subscribe my name this 6th day of November, A. D. 1893.

CHARLES E. SCRIBNER.

Witnesses:
ELLA EDLER,
LUCILE RUSSELL.